Figure 19:
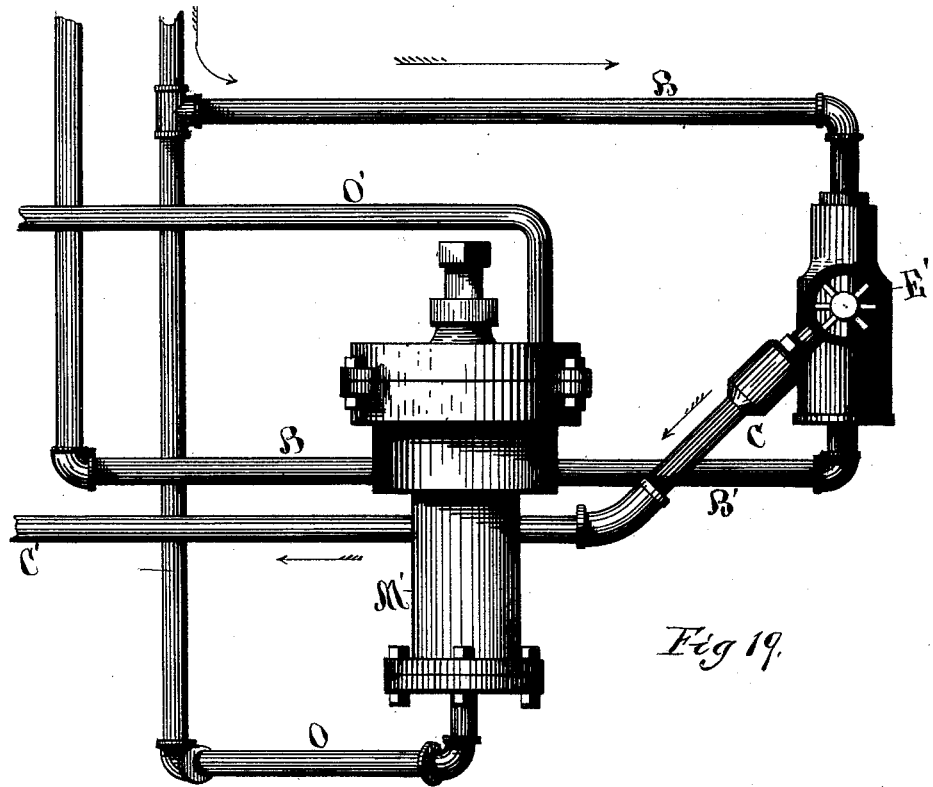

(No Model.) 8 Sheets—Sheet 1.
G. A. HOUSTON & H. HACKNEY.
HEATING RAILROAD CARS OR OTHER STRUCTURES BY THE AGENCY OF LIVE OR EXHAUST STEAM.
No. 415,271. Patented Nov. 19, 1889.
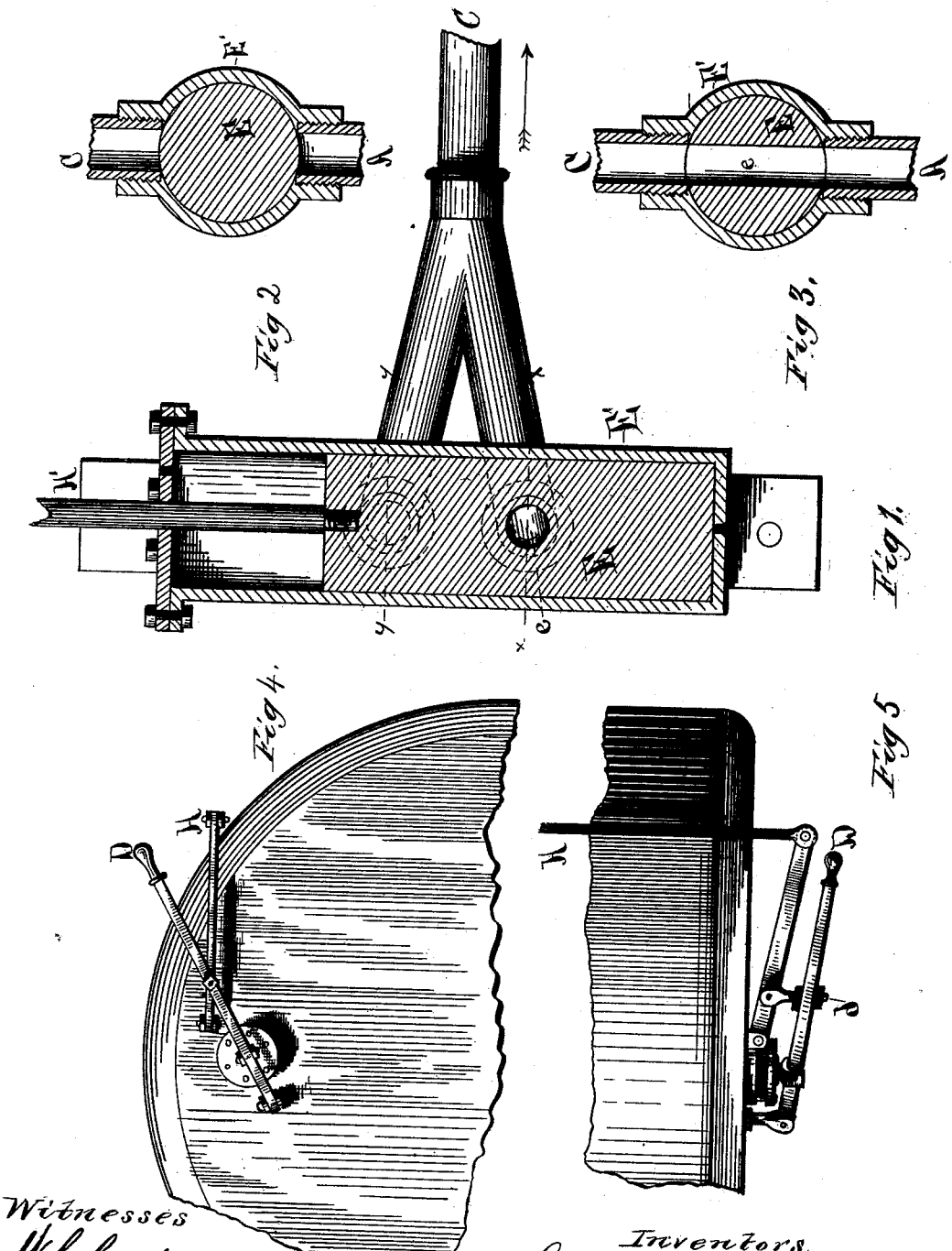

(No Model.) 8 Sheets—Sheet 2.
G. A. HOUSTON & H. HACKNEY.
HEATING RAILROAD CARS OR OTHER STRUCTURES BY THE AGENCY OF LIVE OR EXHAUST STEAM.
No. 415,271. Patented Nov. 19, 1889.
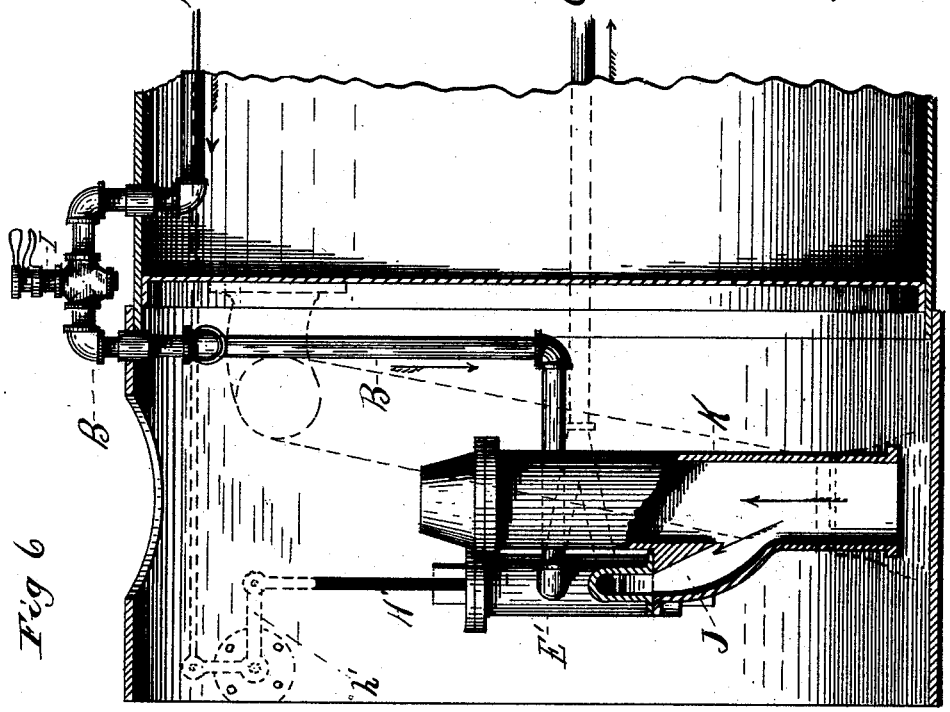
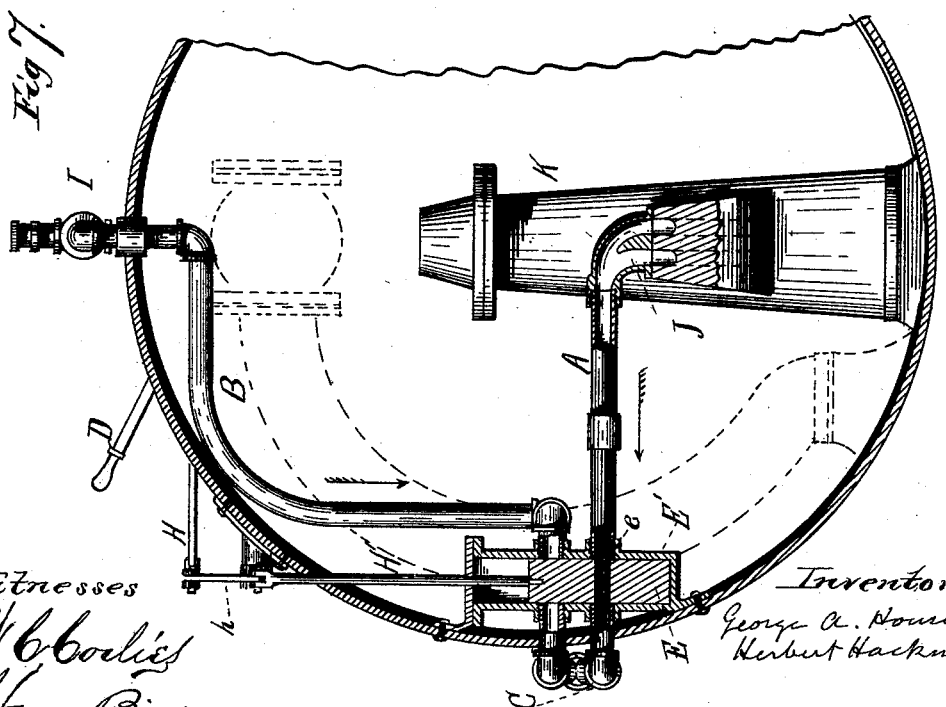

(No Model.) 8 Sheets—Sheet 3.
G. A. HOUSTON & H. HACKNEY.
HEATING RAILROAD CARS OR OTHER STRUCTURES BY THE AGENCY OF LIVE OR EXHAUST STEAM.
No. 415,271. Patented Nov. 19, 1889.
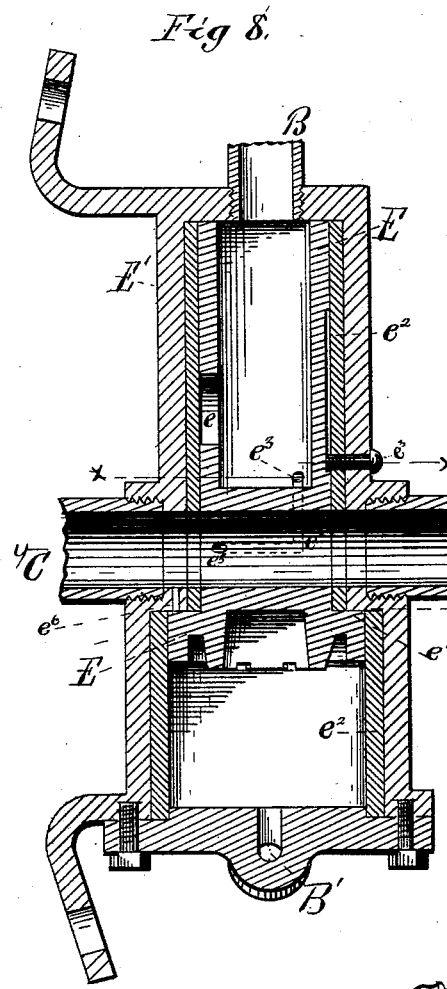
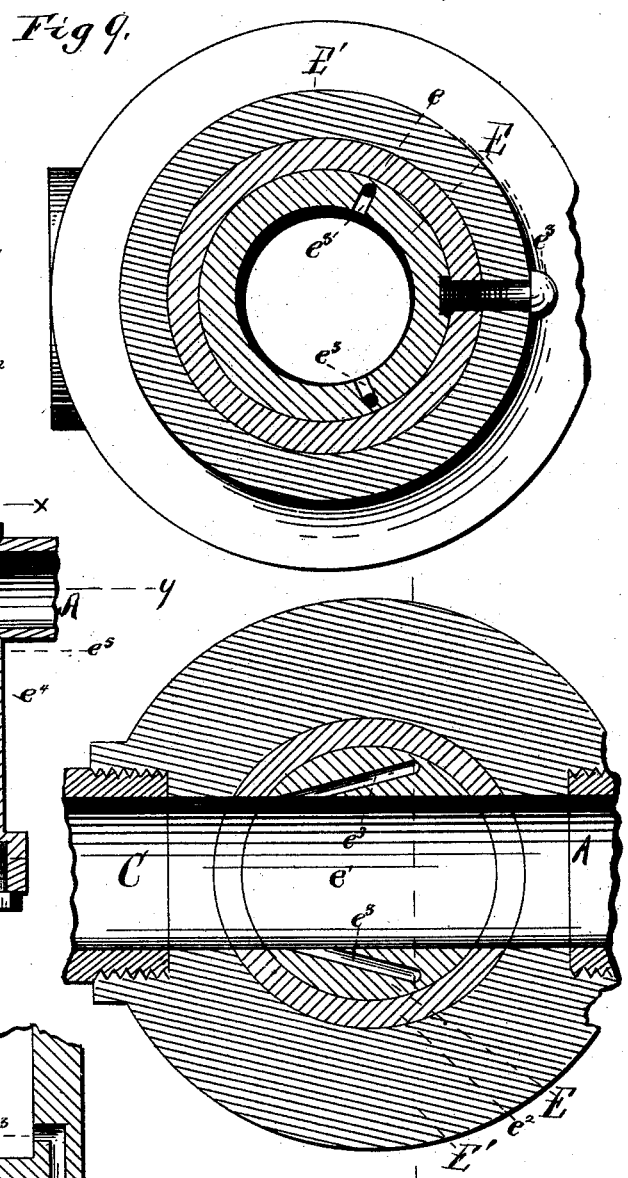

(No Model.) 8 Sheets—Sheet 4.
G. A. HOUSTON & H. HACKNEY.
HEATING RAILROAD CARS OR OTHER STRUCTURES BY THE AGENCY OF LIVE OR EXHAUST STEAM.
No. 415,271. Patented Nov. 19, 1889.
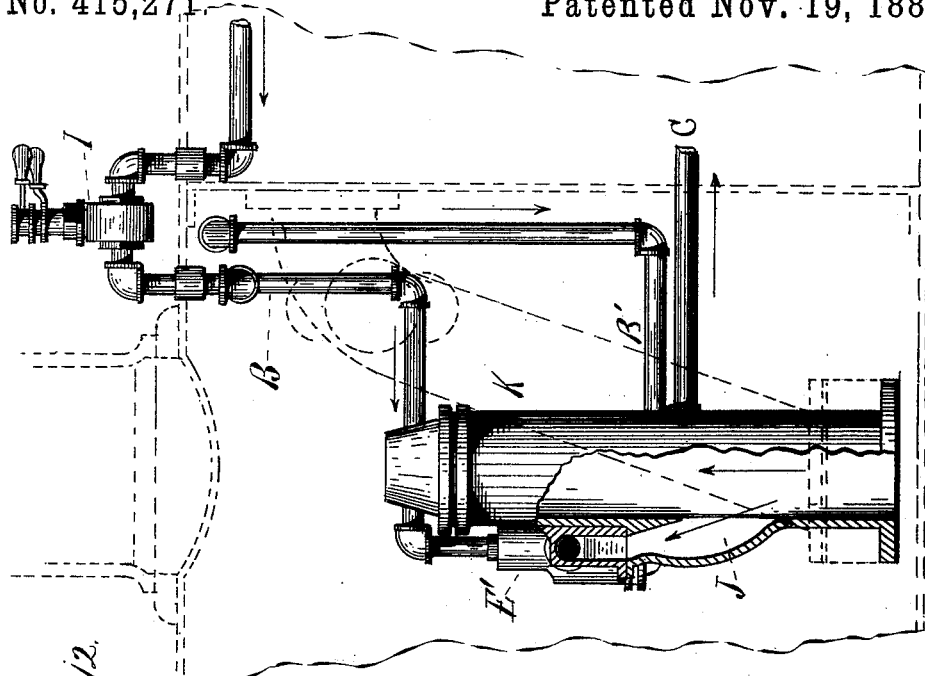
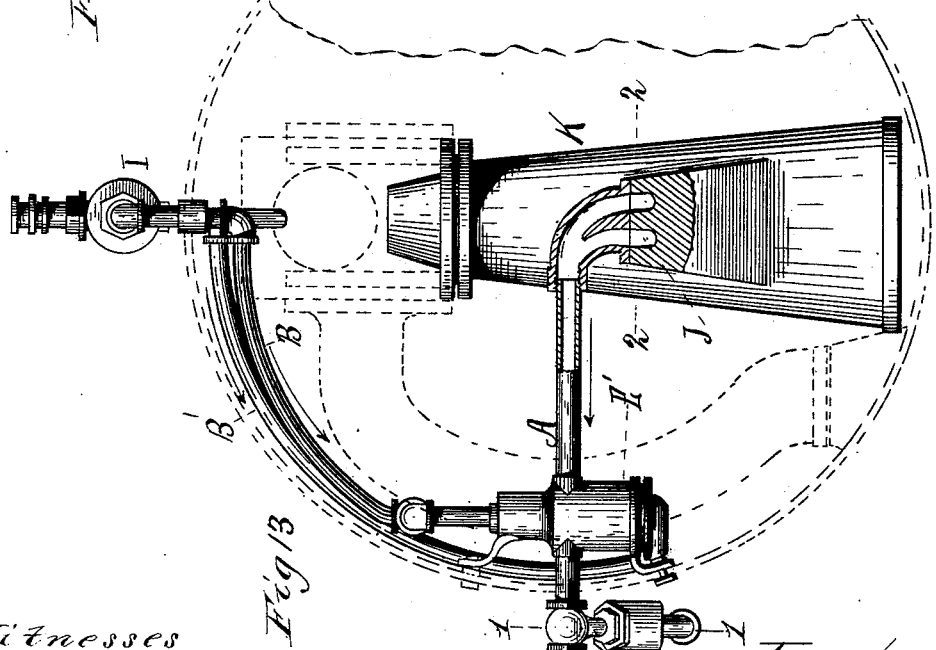
Witnesses
W. C. Corlies
Harry Bitner
Inventors
George A. Houston
Herbert Hackney
By Hill & Dixon
their Attys

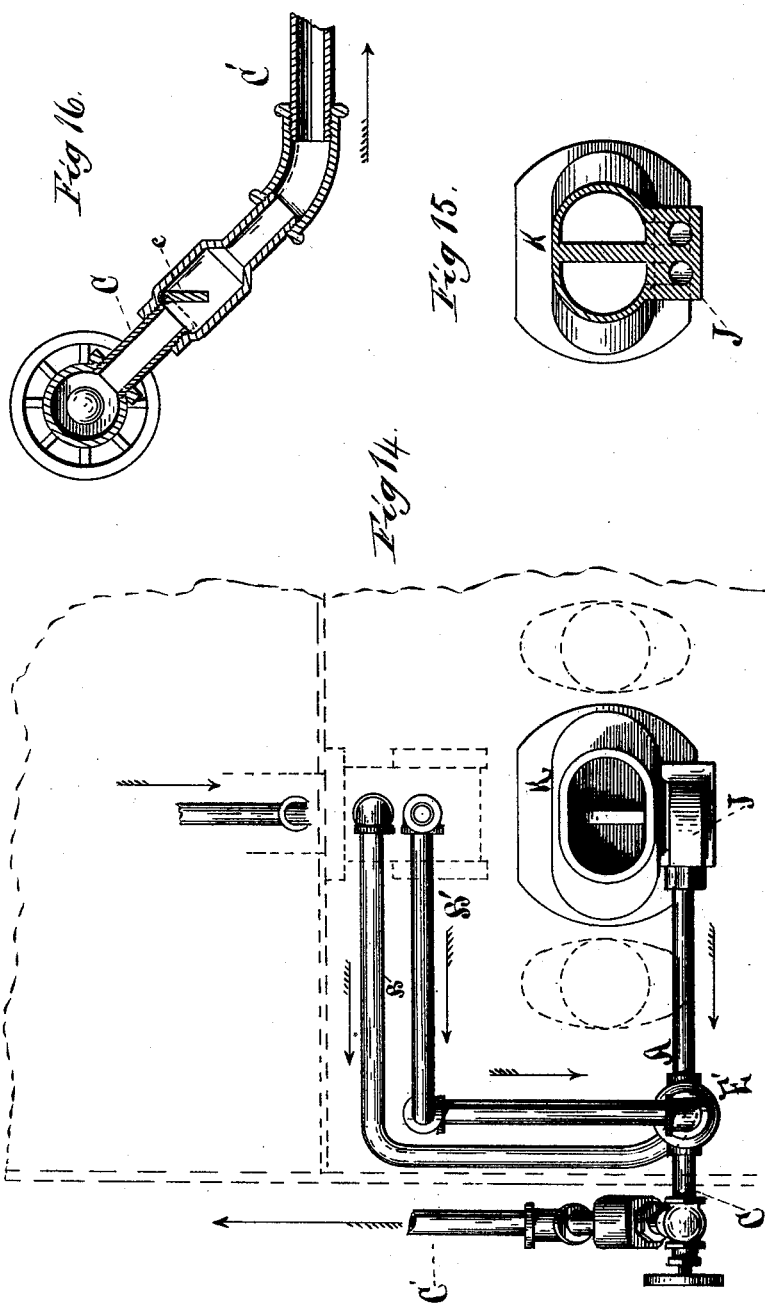

(No Model.) 8 Sheets—Sheet 6.
G. A. HOUSTON & H. HACKNEY.
HEATING RAILROAD CARS OR OTHER STRUCTURES BY THE AGENCY
OF LIVE OR EXHAUST STEAM.
No. 415,271. Patented Nov. 19, 1889.
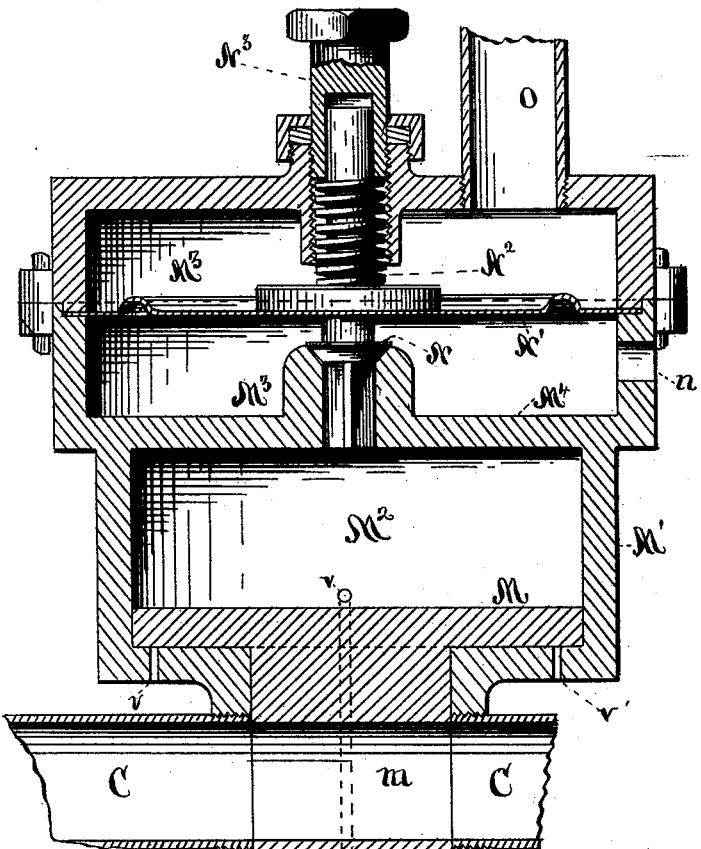
Fig 17.
Fig 18.
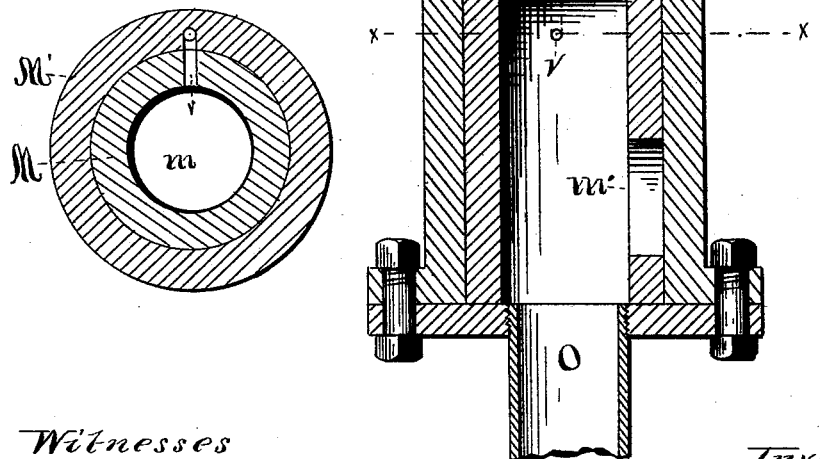
Witnesses
W. C. Corlies
Harry Peters
Inventors
George A. Houston
Herbert Hackney
By Hill & Dixon
their Attys (No Model.) 8 Sheets—Sheet 7.

G. A. HOUSTON & H. HACKNEY.
HEATING RAILROAD CARS OR OTHER STRUCTURES BY THE AGENCY OF LIVE OR EXHAUST STEAM.

No. 415,271. Patented Nov. 19, 1889.

Witnesses
W. C. Corliss
Harry Bitner

Inventors
George A. Houston
Herbert Hackney
By Hill & Dixon
Their Attys

N. PETERS, Photo-Lithographer, Washington, D. C.

(No Model.) 8 Sheets—Sheet 8.

G. A. HOUSTON & H. HACKNEY.
HEATING RAILROAD CARS OR OTHER STRUCTURES BY THE AGENCY OF LIVE OR EXHAUST STEAM.

No. 415,271. Patented Nov. 19, 1889.

Witnesses
Harry Bitner
Chas. T. Hill

Inventor
George A. Houston
Herbert Hackney
By their Attorneys
Hill & Dixon

UNITED STATES PATENT OFFICE.

GEORGE A. HOUSTON, OF BELOIT, WISCONSIN, AND HERBERT HACKNEY, OF TOPEKA, KANSAS.

HEATING RAILROAD-CARS OR OTHER STRUCTURES BY THE AGENCY OF LIVE OR EXHAUST STEAM.

SPECIFICATION forming part of Letters Patent No. 415,271, dated November 19, 1889.

Application filed February 15, 1888. Serial No. 264,166. (No model.)

*To all whom it may concern:*

Be it known that we, GEORGE A. HOUSTON and HERBERT HACKNEY, citizens of the United States of America, said HOUSTON residing at Beloit, in the county of Rock and State of Wisconsin, and said HACKNEY residing at Topeka, in the county of Shawnee and State of Kansas, have invented certain new and useful Improvements in Heating Railroad-Cars and other Structures by the Agency of Live and Exhaust Steam, of which the following is a specification.

In the accompanying drawings our improvements are illustrated as applied to the heating of railroad-cars by steam from the locomotive; but they are equally applicable to the heating of all other structures where engine-steam is available for use.

In said drawings, Sheets 1 and 2, Figs. 1 to 7 show the construction and arrangement of the valve when designed to be operated directly by the movement of the throttle-lever, Fig. 1 being a vertical section of the valve and casing; Fig. 2, a cross-section of the same in line $x\,x$ of Fig. 1; Fig. 3, a cross-section in line $y\,y$ of Fig. 1; Fig. 4, an end elevation of the connection to the boiler, showing the connection to the throttle-lever; Fig. 5, a top view of the same; Fig. 6, a longitudinal vertical section of the smoke-arch, showing the arrangement of the parts therein, a portion of the details being in section; and Fig. 7, a cross-section of the smoke-arch, showing the same parts partly in section.

Sheets 3, 4, 5, Figs. 8 to 16 illustrate the construction and arrangement of the valve when designed to be operated indirectly by the movements of the throttle-lever, Fig. 8 being a vertical section of the valve and casing; Fig. 9, a cross-section in line $x\,x$ of Fig. 8; Fig. 10, a cross-section in line $y\,y$ of Fig. 8; Fig. 11, a vertical section of the lower part of the valve; Fig. 12, a view of the parts as arranged in the smoke-arch with a partial section of the blast-cone; Fig. 13, another view of the same parts; Fig. 14, a top plan of the same; Fig. 15, a horizontal section of the blast-cones, and Fig. 16 a view showing the construction of the check-valve.

Figure 20:
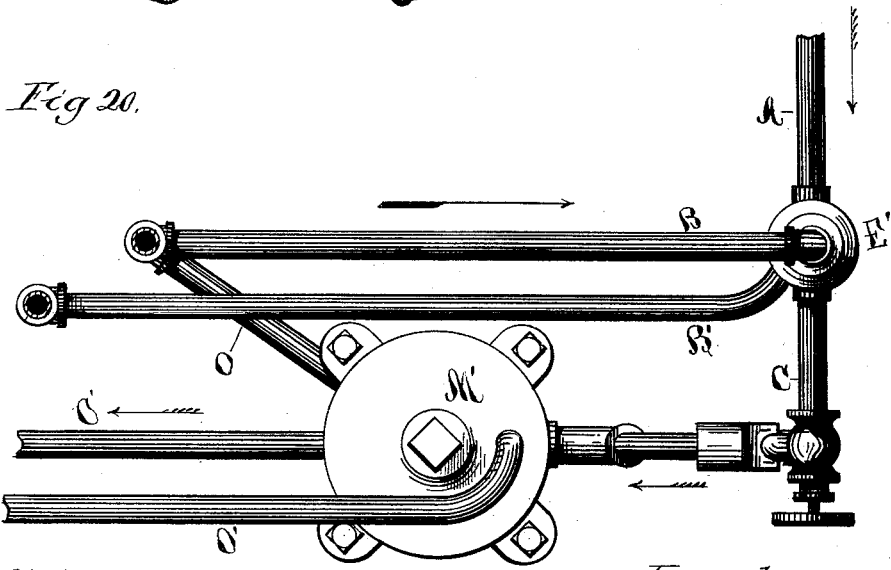
Figure 21:
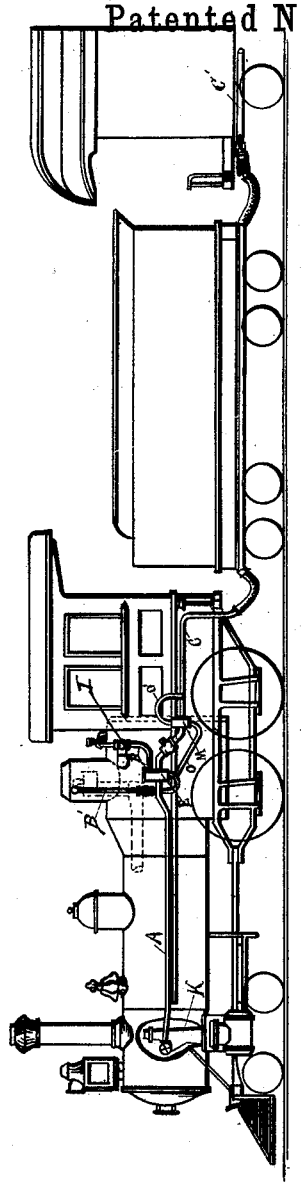

Sheets 6 and 7, Figs. 17 to 20 represent the construction and arrangement of the automatic pressure-regulator, Fig. 17 being a vertical section of the regulating device; Fig. 18, a cross-section in line $x\,x$ of Fig. 17; Fig. 19, a side elevation of the same device and its connections; Fig. 20, a top plan of the same; and Fig. 21 is a general view illustrating the arrangement of the several parts hereinafter described.

Similar letters of reference indicate the same or corresponding parts.

In the heating of railroad-cars, buildings, &c., by steam derived from the engine or its boiler some inventors use the live steam and others the exhaust-steam for that purpose, while others have suggested the use of both, and have proposed to provide a separate cock or cocks by which the engineer shall be able to turn either the live or exhaust steam at will into the heating-circulation, in order to heat by the agency of live steam when the engine is at rest and of exhaust-steam when it is at work. In some structures—for example, locomotives—the exhaust-steam must be used to insure or regulate the furnace-draft, and it has accordingly been proposed to provide a cock which, when turned to one position, admits it to the blast-pipes of the smoke-flue, and when turned to another position admits it to the heating-circulation of the cars, but which does not admit it to both at the same time.

The constructions heretofore devised for heating by live and exhaust steam involve the disadvantage that if the engineer forgets or neglects to properly turn the cocks when he stops the engine the steam is shut off from the cars, and, on the other hand, if he does not change them when he starts the engine the live steam is wasted and the exhaust-steam not utilized.

Another difficulty heretofore attendant upon the use of exhaust-steam for heating purposes arises from the fact that the pressure of such steam is liable at times to run so low as not to produce the proper circulation throughout the heating-pipes nor convey the necessary amount of heat to the system.

The ideally-perfect construction is one in which the heating pressure and capacity shall regulate themselves automatically, the exhaust-steam shall perform both of its important functions simultaneously without interference, the turning of the live steam into the engine-cylinders shall be accompanied automatically by the turning of exhaust-steam into the heating-circulation, and the cutting off of live steam from the engine-cylinders shall be accompanied automatically by the turning of live steam into the heating-circulation, whereby the whole system shall take care of itself automatically and the engineer be relieved from the necessity of giving any attention to its working—a construction which it is the object of our invention to produce so far as it is mechanically practicable.

To this end the essential principles of our car-heating system as a whole, which distinguish it from all preceding systems, are as follows: First, we have demonstrated by practical operation that a portion of the exhaust-steam from the engine-cylinders substantially sufficient in amount and pressure to ordinarily maintain the proper temperature in a train of cars in cold weather during the running of the train by steam-power may be taken from the main exhaust-pipes of a locomotive while it is at work under steam wholly or mainly by the aid of the exhaust-steam pressure therein, without placing in said pipes any obstruction to the free escape of the steam through the blast-pipes to the atmosphere in the usual manner, and therefore without interfering with the ordinary function of the exhaust-steam in forcing the furnace-draft; and the first feature of our invention consists in the utilization of said discovery in the manner and by the means substantially as hereinafter set forth.

The second feature of our invention consists in causing the movement of the throttle-lever for the purpose of admitting steam to and cutting it off from the engine-cylinders, to be accompanied or followed automatically by the turning of live-steam into the heating-circulation when the engine is not at work, and exhaust-steam when it is at work, substantially as hereinafter set forth.

The third feature of our invention consists in the employment of a quick-acting automatic valve controlled by the steam-pressure in the heating system, and operating to almost instantly restore the normal pressure in said system whenever, from any cause, the exhaust-steam runs too low for that purpose. Other subordinate improvements will be indicated by the claims hereto appended.

In the practical operation of our improved system as applied to railroad-trains we charge the heating-pipes throughout the train with the live steam from the locomotive, or from a shifting-engine or other source of steam, a short time before the train is ready to start on its trip, and thereby bring the temperature of the cars and the pressure of steam in their heating-pipes up to the normal. Such temperature and pressure once established are easily maintained, and we therefore while the engine is running under steam divert from the open exhaust-pipes a comparatively small portion of the exhaust-steam and force it into the heating-circulation by its own pressure. This produces no additional back-pressure on the engine-pistons, does not interfere with the function of the main body of exhaust-steam in forcing the blast, economizes the live steam, and is ordinarily sufficient to maintain the temperature of the cars even during long runs in extremely cold weather; but whenever on downgrades or at way-stations or elsewhere steam is shut off from the engine-cylinders and exhaust-steam therefore ceases to be supplied, live steam under reduced pressure automatically takes its place in the heating system, instead of being merely wasted through the safety-valve. If at any time while the engine is running and the heating-circulation is relying upon exhaust-steam the pressure of the heating system should fall too low, live steam will be instantly injected into it in sufficient quantity to restore it at once to its normal pressure through the operation of an automatic valve, which will then immediately close and shut off the live steam until it is again required for the same purpose. The system is thus completely automatic and self-regulating, uses only a trifling quantity, if any, of live steam when the engine is working, but when the engine is not at work utilizes for heating purposes the surplus live steam that would otherwise be wasted.

There are several ways in which the movement of the throttle-lever to start or stop the engine may be enabled to turn live or exhaust steam into the heating-circulation in the manner and for the purpose stated; but all of them depend upon the governing of a controlling valve or cock directly or indirectly by the same lever which governs the throttle-valve. The movements of the controlling-valve may be effected by the throttle-lever directly by means of a rod or other connection extending from said valve to the throttle-valve rod or lever, so that the same movement of the lever which works the throttle-valve through its rod will work the controlling-valve through its rod or other connection, and they may be effected indirectly in various ways—for example, by causing the change of steam-pressure, which results from the movement of the throttle-lever, to actuate the controlling-valve through the agency of a piston or its equivalent.

In the drawings, A represents a branch pipe, which takes a portion of the exhaust-steam from the exhaust-passage of the engine at some point between the induction and eduction ends of said passage. B is a pipe provided with a reducing-valve I, which receives live steam from the boiler or any suitable pipe or chamber communicating therewith. C is a pipe connected to the heating system, (indicated at C',) through which live and exhaust steam are severally conveyed to said system. D is the throttle-lever connected to the throttle-valve by the usual rod, and E is the controlling-valve whose movements, produced directly or indirectly by the movement of the lever D to actuate the throttle-valve, govern the admission of live or exhaust steam to the heating system. These parts, with more or less structural modification, are common to all of the several forms of apparatus illustrated in the drawings.

In Figs. 1 to 7 the valve E, controlled directly by the throttle-lever, is connected thereto by rods H H' and a bell-crank lever $h$, so that when the throttle-valve is drawn back to admit live steam to the steam-chests the valve E is moved downward, and when said lever is reversed to shut off steam from the steam-chests the valve E is moved upward in its casing E'. The valve is provided with a port $e$, so arranged with reference to the exhaust branch A and the live-steam pipe B that when said valve is down it admits exhaust-steam through the pipe C to the heating system in the several cars, and when up it closes the passage from the exhaust to the pipe C and opens communication from the pipe B to the pipe C, thereby venting live steam at a reduced pressure into the heating system and preventing its escape through the blast-pipes to the open air.

The connecting-rod H may be adjustably attached to the lever D, as shown at $d$ in Fig. 5, so as to let the live steam into or shut it off from the heating system at any preferred position of the throttle-valve, and in the summer it may be disconnected altogether. By adjusting the valve E so that the port $e$ will gradually close as the throttle-valve is opened, and will be entirely closed somewhat before the latter is fully opened, both live and exhaust steam will be delivered into the heating system simultaneously when the engine is running slowly or moderately, and the amount of live steam so utilized will decrease in proportion as the throttle-valve is opened and increase in proportion as it is closed, whereby any deficiency in the amount of available exhaust-steam will be compensated for, and yet only the excess of live steam not needed for use in the cylinders will be thrown into the heating-circulation.

The valve-rod H, instead of connecting directly to the throttle-lever D, may be connected to a separate lever arranged at the side of the latter, so that both levers can be grasped and operated simultaneously by one hand—a construction which is the equivalent of a single lever, and so obvious as to need no illustration.

In Figs. 8 to 16, which illustrate the indirect control of the valve E by the lever D through the variations of steam-pressure which result from the movements of the latter, the several parts may be arranged in any convenient and suitable position.

As before, by means of the pipe A, I take exhaust-steam from any part of the main exhaust-passage—for example, in locomotives, preferably from the blast-cones K in the smoke space or flue, by means of an enlargement, offset, or side chamber J, communicating freely with the interior of both cones, so as to be completely filled with exhaust-steam when the engine is working, and subject to whatever degree of steam-pressure may be produced in the main exhaust-passage by the escaping steam therein. In this construction the pipe A leads into a valve-casing E', from which the pipe C conducts the steam away to the heating system. Two pipes B B' connect opposite ends of the valve-casing E' to the main steam-pipe of the engine, one of them B' entering the main steam-pipe on the eduction side of the throttle-valve, so as to take steam only when the engine is working under steam, and the other B entering on the induction side, so as to take steam all the time, and preferably provided with a reducing-valve I to reduce the pressure of the steam delivered by it into the valve-casing E'.

The valve-casing E' is provided with a proper bushing $e^2$ and contains the controlling-valve E, which, in the form here illustrated, is a sliding piston controlled by steam from the pipes B B'. When the engine is at work, steam enters both above and below the piston; but the greater pressure, which enters below through the pipe B', which has no reducing-valve, holds the piston at the top of the casing. When the throttle-valve is closed and the steam thereby shut off from the steam-chest, the pressure at the lower end of the piston E is relieved and the pressure above through the pipe B sends the piston to the bottom of the casing. The position of the piston is therefore automatically controlled by the movements of the lever D through the changes of steam-pressure produced thereby in the steam-chest or its supply-pipe.

The piston E contains two ports $e$ $e'$, and, being guided by a pin $e^3$ and slot in the usual manner, operates by means of said ports to control the admission of live or exhaust steam to the heating system. When the engine is working, the port $e'$ puts the exhaust-steam branch A into communication with the pipe C, and thereby delivers exhaust-steam to the heating system. When the engine is not working, the port $e'$ is out of line with the pipes A C, thereby putting the heating system out of communication with the exhaust, and the port $e$ is in line with the pipe C, thereby letting the live steam, under reduced pressure, freely into and through the heating system.

One or more small jet holes may, if desired, be drilled through the wall of the valve E above the port $e'$, thence down to the outside surface of the valve to the level of said port, and thence in a direction forward toward the heating system and inward toward the port $e'$, so as to come out into said port near the delivery end thereof, whereby a small but constant jet or jets of live steam will be forced into the exhaust-steam passing through said port in the same direction with it, thereby promoting its movement without decreasing appreciably the boiler-pressure. It will be seen that the movement of the lever D to shut off steam from the engine causes the surplus live steam of the boiler to be delivered through the port $e$ into the heating-system, while its movement to let steam into the engine causes the exhaust-steam to be delivered into the heating system and cuts off therefrom all the live steam, except the small quantity employed in forcing the movement of the exhaust-steam.

The valve E, in addition to its other functions, prevents the live steam from escaping to the main exhaust-passage and thence to the atmosphere. The difference of pressure at the opposite ends of the piston-valve E constitute the latter, in effect, a differential piston, and will ordinarily suffice to enforce its movements; but for greater assurance we prefer to employ a piston having differential surfaces, the larger end of which is subject to the pressure from the pipe B', and the smaller end to that from the pipe B. In such case the shoulder $e^4$ of the piston, seating against the corresponding shoulder $e^5$ of the casing when the engine is at work, will, if the contact-surfaces are ground, form a steam-tight joint, and a pin-hole $e^6$, leading into the pipes A or C, will relieve from any pressure or vacuum between said surfaces. When the differential surfaces of the piston are properly proportioned, the reducing-valve I may be dispensed with, as they will be the equivalent thereof so far as the action of the piston is concerned; but it is better to use the reducing-valve, in order to properly regulate the live-steam pressure in the heating-pipes. The ordinary steam-piston packing may be employed to pack the piston, if preferred, although any slight leakage around it can only go into the heating system, and therefore will do no damage.

Having thus explained how we obtain and control the steam used for heating purposes, we will now proceed to describe the means by which we enable the steam-pressure in the heating system to determine whether live or exhaust-steam shall be admitted thereto and to almost instantly supply any lack of pressure in the heating system. When the valve E is open for the admission of live steam, as above set forth, and the heating-pipes and connections are in proper condition, the pressure in the car-heating system will never fall below the minimum; but when the valve E is closed to the live steam and open to the exhaust-steam only it is possible for such fall to take place, especially when the engine is working with its throttle-valve only partially open. We have therefore contrived a supplementary valve device, which controls the steam-passage leading to the cars in such a manner that whenever the pressure in the heating system C' runs down below the normal the valve will suddenly move and admit instantly a full supply of live steam into the heating-pipes, and will then resume its normal position, as before. This contrivance is represented in Figs. 17 to 20, and in the form here shown is constructed as follows: M' is a casing containing a differential-surface piston-valve M, to the smaller end of which live steam under the uniform pressure produced by the reducing-valve is admitted through a branch pipe O, a portion of said steam slowly passing through the valve by means of a pin-hole $o$, (shown in dotted lines,) and acting against the larger end of the piston in the chamber $M^2$, so as to hold the valve normally in the position shown in Fig. 17. $M^3$ is a chamber separated from chamber $M^2$ by a transverse partition $M^4$ and containing a flexible diaphragm N', to which is attached a valve N, that normally closes a passage between chambers $M^2$ $M^3$, the diaphragm N' and valve N constituting substantially a differential valve. A spring $N^2$, provided with an adjusting device $N^3$, serves to regulate the force with which the diaphragm will resist the opening of the valve N. O' is a pipe connected to the heating system C', through which the space at the outer side of the diaphragm in chamber $M^3$ is filled with steam at the pressure existing in the heating system, whatever that may be. At the opposite side of the diaphragm the chamber $M^3$ is open to the air through a port $n$. A series of pin-holes $v'$ $v'$, extending through the casing M', is provided under the enlarged head of the piston-valve to prevent atmospheric pressure from interfering with its movement. The piston-valve itself is provided with a through-port $m$, which, when the valve is in its normal position, as shown, allows the exhaust-steam to pass through to the heating system. When, however, the piston-valve is moved from its normal position, it closes the through-port, cutting off the exhaust-steam from the heating system, and opens a port $m'$, through which the live steam from the pipe O is delivered into said system. The pipe shown in Fig. 17 as in communication with the through-port $m$ may be either of the pipes A, C, or C', but preferably C or C'; and a check-valve $c$ should be arranged in it to prevent the full pressure introduced in the heating system from pipe O from venting back to the blast-cones K when the piston-valve resumes its normal position. The best arrangement for the check-valve is shown in Fig. 16, where it is in the form of a pendent flap-valve hinged at its upper edge in an incline of the pipe, so as to hang normally about half-open, thereby presenting substantially no resistance to the passage of the exhaust-steam into the heating system, but ready to close the pipe instantly against any reverse movement of the steam.

The operation of the equalizing supplementary valve device is as follows: Normally the parts are held in the position shown in Fig. 17, the reduced live-steam pressure in pipe O and chamber $M^2$ holding the differential piston to its seat, and the train-pipe pressure in the pipe O', acting on the large diaphragm N' against the small resistance of valve N, holding the latter to its seat so long as the pressure through pipe O' is at or above the normal. When, however, the pressure in pipe O' falls below the normal, the live-steam pressure in chamber $M^2$ opens valve N and vents to the atmosphere, whereupon the pressure in pipe O instantly throws the piston-valve to the farther end of its traverse and vents into the heating system. As soon as the pressure in the heating system reaches its normal it closes valve N, whereupon chamber $M^2$ again fills with live steam through the pin-hole $r$, and the piston-valve resumes its normal position. It is at this point that the check-valve $c$ comes into operation. Inasmuch as the normal pressure now existing in the heating system is presumably greater than that of the exhaust-steam in the blast-cones it would tend to overcome the exhaust-pressure and vent out into the smoke-flue were not the check-valve placed in the pipe C, C', or A to prevent such back movement.

In taking exhaust-steam from the blast-cones K we desire to avail ourselves of that law of fluid-pressure by which the velocity of discharge is accelerated in proportion as the discharge-orifice is reduced and properly tapered. We therefore, instead of extending the branch-pipe A directly into the blast-cones, prefer to construct each cone with a chamber or offset J, which will fill with exhaust-steam, and to taper the chamber J to the point where the branch pipe is connected. By this means the steam, under the pressure contained in the lateral chamber J, is projected with considerable velocity through the pipe A.

Our various improvements are susceptible of considerable structural modifications without departing from the principles of the invention, and they may be used conjointly or separately. In all the various forms of their practical application they operate automatically, requiring no care or attention on the part of the engineer. Suitable cocks (not necessary to be illustrated, because within the skill of any ordinary mechanic) may be provided wherever required to cut off the various pipes from the heating system in warm weather.

While the automatic regulating-valve M is intended to be used as supplementary to the automatic controlling-valve E for the purpose not of controlling the admission of steam to the heating system, but of regulating the pressure therein, it is also capable of use in lieu of the valve E, both for controlling and regulating the pressure in the heating system. If substituted for the valve E, it will at first admit live steam into the heating-circulation until the normal pressure therein is attained, after which it will automatically shut off the live steam and admit the exhaust-steam, and will from time to time supply any deficiency in the pressure of the heating system, as above described. We prefer, however, to use the valve E for controlling and the valve M for regulating the heating steam and pressure, as hereinabove set forth.

We claim as our invention—

1. In a steam-heating system, the combination, substantially as described, of the following elements, viz: the boiler and steam-engine, the steam-pipe containing the throttle-valve actuated by a lever or its equivalent for supplying steam to the engine-cylinders, the live-steam pipe having a reducing-valve arranged therein, the steam-heating pipe communicating with the live-steam pipe at the eduction side of the reducing-valve, a valve arranged in the live-steam pipe to control the flow thereof, and means for causing the opening of the throttle-valve to be accompanied by the closing of the valve in the live-steam pipe and the closing of the throttle-valve to be accompanied by the opening of the valve in the live-steam pipe.

2. In a steam-heating system, the combination, substantially as described, of the following elements, viz: the boiler, the live-steam pipe, the steam-heating pipe communicating with the live-steam pipe, the exhaust-steam pipe leading from the exhaust-steam passages of the engine to the steam-heating pipe, the steam-pipe containing the throttle-valve for supplying steam to the engine-cylinders, valves for alternately cutting off the flow of live and exhaust steam to the steam-heating pipe, and means for operating them when the throttle-valve is actuated, whereby, when the throttle-valve is open, the exhaust-steam valve is open and the live-steam valve is closed, and when the throttle-valve is closed the exhaust-steam valve is closed and the live-steam valve is open.

3. In a steam-heating system, the combination, substantially as described, of the following elements, viz: the boiler, the steam-pipe containing the throttle-valve for supplying steam to the engine-cylinders, the steam-pipe B, taking steam from the induction side of the throttle-valve and containing a reducing-valve, the steam-pipe B', taking steam from the eduction side of the throttle-valve, the steam-heating pipe communicating with the steam-pipe B, and a valve controlling the communication between the heating-pipe and the pipe B, and so controlled by the steam-pressures in the pipes B B' as to be open when the throttle-valve is closed and closed when the throttle-valve is open.

4. In a steam-heating system, the combination, substantially as described, of the following elements, viz: the boiler, the steam-pipe containing the throttle-valve for supplying steam to the engine-cylinders, the exhaust-steam pipe leading from the exhaust-steam passages of the engine, the steam-heating pipe communicating with the exhaust-steam pipe, the steam-pipe B, taking steam from the induction side of the throttle-valve, the steam-pipe B′, taking steam from the eduction side of the throttle-valve, and a valve controlling communication between the steam-heating pipe and the exhaust-steam pipe, and so controlled by the steam-pressures in the pipes B B′ as to be open when the throttle-valve is open and closed when the throttle-valve is closed.

5. In a steam-heating system, the combination, substantially as described, of the following elements, viz: the boiler, the live-steam pipe, the steam-heating pipe communicating with the live-steam pipe, the exhaust-steam pipe leading from the exhaust-steam passages of the engine to the steam-heating pipe, the steam-pipe containing the throttle-valve for supplying steam to the engine-cylinders, a check-valve arranged in the exhaust-steam pipe, and a regulating-valve at the eduction side of the check-valve actuated by pressure in the steam-heating pipe at its own eduction side arranged with relation to the live-steam pipe, exhaust-steam pipe, and steam-heating pipe, substantially as set forth, and adapted to automatically operate so as to cut off the exhaust-steam and admit the live steam when the pressure in the heating-pipe is too low and to reverse such action when the pressure in the heating-pipe is at or above the normal.

Witness our hands, at Chicago, in the State of Illinois, this 1st day of February, A. D. 1888.

GEORGE A. HOUSTON.
HERBERT HACKNEY.

Witnesses:
L. HILL,
HARRY BITNER.